US011115345B2

(12) United States Patent
Kurian et al.

(10) Patent No.: US 11,115,345 B2
(45) Date of Patent: Sep. 7, 2021

(54) SYSTEMS AND METHODS FOR PROVIDING SELF-REFERENCING UTILIZATION CALCULATION AND DYNAMIC RESOURCE ALLOCATION BASED THEREON FOR DIGITAL TRANSMISSIONS

(71) Applicant: Bank of America Corporation, Charlotte, NC (US)

(72) Inventors: Manu Kurian, Dallas, TX (US); Gopikrishna Nemalikanti, Frisco, TX (US); Saritha Vrittamani, Plano, TX (US); Jayachandra Varma, Irving, TX (US); Jason T. Findley, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 16/403,729

(22) Filed: May 6, 2019

(65) Prior Publication Data

US 2020/0358712 A1 Nov. 12, 2020

(51) Int. Cl.
*H04L 12/911* (2013.01)
*H04L 12/803* (2013.01)
(Continued)

(52) U.S. Cl.
CPC ............ *H04L 47/726* (2013.01); *H04L 41/22* (2013.01); *H04L 43/0876* (2013.01);
(Continued)

(58) Field of Classification Search
CPC .............. G06F 11/079; G06F 12/0246; G06F 12/0871; G06F 12/128; G06F 16/285; G06F 16/29; G06F 2111/20; G06F 21/10; G06F 2212/604; G06F 2212/7202; G06F 2212/7203; G06F 2212/7207; G06F 2212/7208; G06F 30/398; G06F 11/2069; G06F 11/3466; G06F 16/148; G06F 16/245; G06F 16/435; G06F 16/48; G06F 3/064; G06F 3/067; G06N 20/00; G06N 3/0454;
(Continued)

(56) References Cited

U.S. PATENT DOCUMENTS 6,832,290 B2  12/2004  Todd
6,877,134 B1   4/2005  Fuller et al.
(Continued)

*Primary Examiner* — Kevin C. Harper
*Assistant Examiner* — Mon Cheri S Davenport
(74) *Attorney, Agent, or Firm* — Weiss & Arons LLP; Michael A. Springs, Esq.

(57) ABSTRACT

Systems and methods for self-referencing utilization calculation and dynamic resource allocation for digital transmissions are provided. Systems may include a target resource module configured to derive and store a target resource allocation for each sender from a plurality of senders. Systems may include a cost-calculation engine configured to generate a resource cost estimate for a transmission based on metadata associated with the transmission, and embed the resource cost estimate in the metadata. Systems may also include a resource allocation module configured to allocate digital resources for the transmission based on the metadata. Allocating digital resources for the transmission may reserve the digital resources for the transmission and prevent overloading of the digital resources.

19 Claims, 5 Drawing Sheets

(51) Int. Cl.
    *H04L 12/26*     (2006.01)
    *H04L 12/805*    (2013.01)
    *H04L 12/24*     (2006.01)

(52) U.S. Cl.
    CPC ............ *H04L 43/16* (2013.01); *H04L 47/125* (2013.01); *H04L 47/365* (2013.01); *H04L 47/822* (2013.01); *H04L 47/823* (2013.01); *H04L 47/828* (2013.01)

(58) Field of Classification Search
    CPC ............... G06Q 30/02; G06Q 30/0256; G06Q 10/06311; G06Q 10/06314; G06Q 10/06315; G06Q 20/3678; G06Q 20/382; G06Q 30/0261; G06Q 30/0269; G01C 21/20; G01C 21/3446; G01C 21/3453; G05D 1/0088; G16H 50/70; H04L 67/1097; Y10S 707/99945; G06K 9/623
    See application file for complete search history.

(56) References Cited

U.S. PATENT DOCUMENTS

| | | | |
|---|---|---|---|
| 7,483,979 | B1 | 1/2009 | Prager |
| 7,805,449 | B1 | 9/2010 | Bone et al. |
| 8,230,393 | B2 | 7/2012 | Bird et al. |
| 8,667,571 | B2 | 3/2014 | Raleigh |
| 8,675,507 | B2 | 3/2014 | Raleigh |
| 9,087,101 | B2 | 7/2015 | Lee et al. |
| 9,191,523 | B1 | 11/2015 | Leemet et al. |
| 9,584,672 | B2 | 2/2017 | Leemet et al. |
| 10,110,436 | B2 | 10/2018 | Short et al. |
| 2015/0312127 | A1 | 10/2015 | Leemet et al. |
| 2017/0257452 | A1* | 9/2017 | Hoiles ................. H04L 67/2842 |
| 2017/0344900 | A1* | 11/2017 | Alzahrani ............. G06N 3/084 |
| 2018/0307856 | A1 | 10/2018 | Nguyen et al. |
| 2019/0166009 | A1* | 5/2019 | Parvin ................. H04L 41/0803 |

* cited by examiner

SYSTEMS AND METHODS FOR PROVIDING SELF-REFERENCING UTILIZATION CALCULATION AND DYNAMIC RESOURCE ALLOCATION BASED THEREON FOR DIGITAL TRANSMISSIONS

FIELD OF TECHNOLOGY

Aspects of the disclosure relate to digital transmissions. Specifically, aspects of the disclosure relate to systems and methods for allocating resources for digital transmissions.

BACKGROUND OF THE DISCLOSURE

Digital transmissions play a vital role in facilitating communications. These communications may be used for a wide array of purposes. Communications relating to personal, business, military, government, emergency, and myriad other uses rely on digital transmissions to quickly and effectively convey data from one point to another.

Processing digital transmissions utilizes resources. Resources may include memory, processing power, communication bandwidth, electricity, and other suitable digital resources. Utilizing the resources may be associated with a cost. The cost may include depleting and/or reserving the resources. Depleting and/or reserving the resources may incur a financial cost.

Commonly, an entity may receive a transmission without complete knowledge of the resources needed for processing the transmission. In certain circumstances, the entity may nevertheless allocate, or reserve, a certain amount of resources for a transmission. The transmission may not utilize the full amount allocated. This may lead to other transmissions being denied resources even though the resources are not actually being utilized.

In other circumstances, the entity may not allocate sufficient resources for the transmission. Not allocating sufficient resources may make it more difficult for the entity to calculate costs after the fact. Not allocating sufficient resources may also leave the entity susceptible to overloading available resources. For example, multiple transmissions may be received at around the same time. The multiple transmissions may attempt to utilize the same resources, overloading the resources. When overloaded, some or all of the multiple transmissions may suffer in quality, or may fail altogether.

Furthermore, unallocated resources may remain exposed to vulnerabilities. For example, a malicious actor may attempt to coopt these resources and store within them unwanted data, or otherwise utilize the resources, in ways not intended by the entity.

It would be desirable, therefore, to provide systems and methods for real-time cost calculation and smart resource allocation for digital transmissions. It would also be desirable to store such information in a convenient location.

SUMMARY OF THE DISCLOSURE

Aspects of the disclosure relate to systems and methods for allocating resources for the processing and storing of digital transmissions. The method may include capturing metadata associated with a transmission. The metadata may include a sender of the transmission, a transmission size, and/or a location of a source of the transmission.

The method may include calculating, based on the metadata, a cost of the transmission. The method may also include embedding the cost as part of the metadata. The method may further include allocating, based on the metadata, a portion of digital resources for the transmission. Allocating the portion of digital resources for the transmission may reserve an amount of the digital resources for the transmission and prevent overloading of the digital resources.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
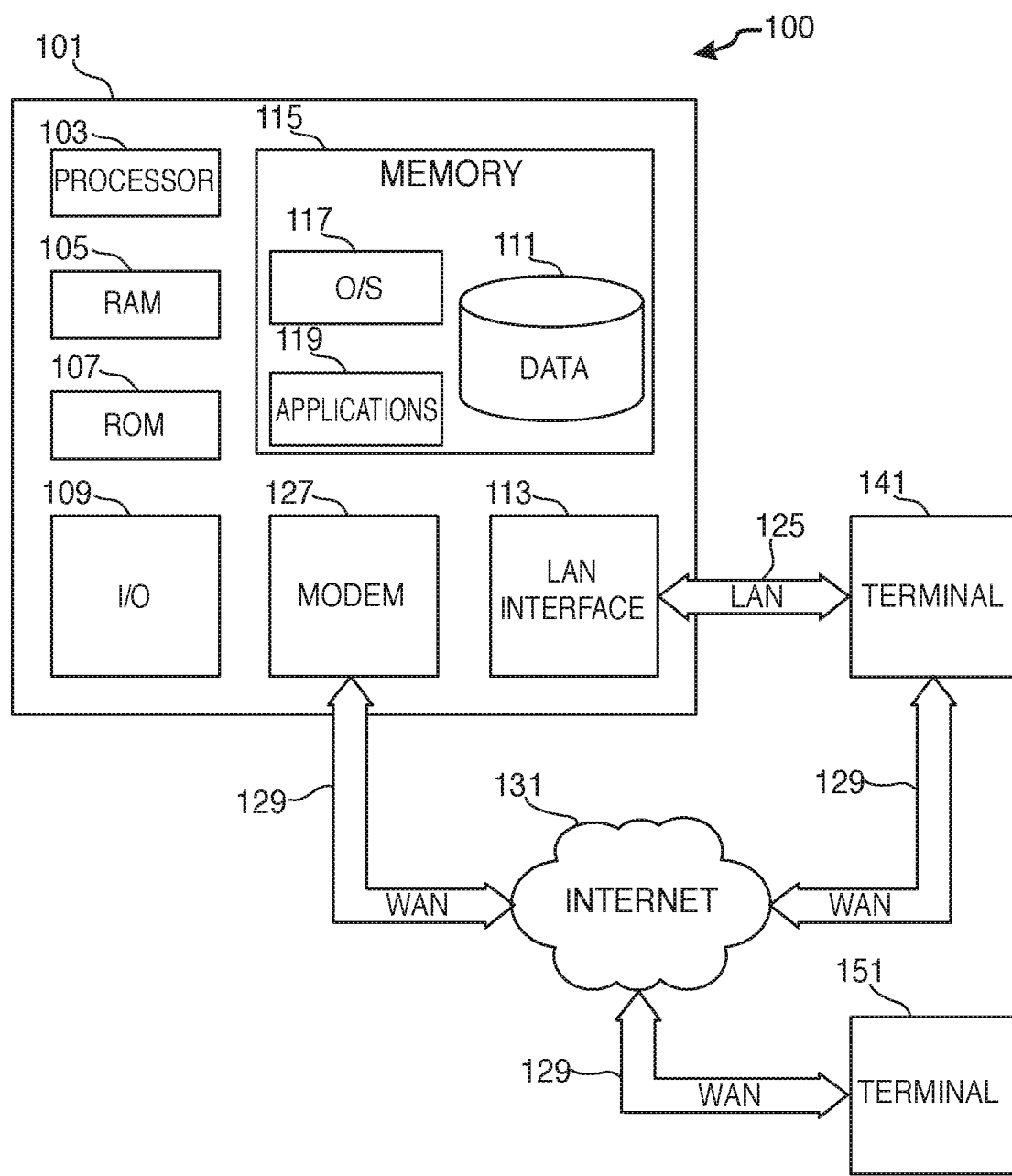
FIG. 1 shows an illustrative system in accordance with principles of the disclosure.

A method is provided for self-referencing utilization calculation and resource allocation for the processing and storing of digital transmissions (alternatively referred to herein as "transmissions").

The transmission may include a payload and metadata. The payload may include content that satisfies the purpose of the transmission, and the metadata may include information about the payload and/or transmission.

For example, the payload of a transmission received by a financial institution may include files, documents, contracts, or any other data suitable for various financial transactions, e.g., payment processing. The metadata may include any suitable information about the transmission, such as a sender of the transmission, a status or classification of the transmission, nature of the payload, a size of the transmission or payload, a location (e.g. of a source or destination) of the transmission, and/or a timestamp (e.g., a date and/or a time of day) of the transmission.

Processing the transmission may include storing all or part of the transmission. Processing the transmission may include conducting a search, making a calculation, forwarding the transmission to another location (internal or external to the entity), and/or executing any suitable digital process associated with the transmission.

The method may include capturing metadata that is associated with a transmission. In some embodiments of the method, the metadata may be encapsulated with the transmission. The metadata may be stored in a wrapper, a header, and/or any suitable predetermined location of the transmissions that may facilitate accessibility of the metadata. In some embodiments, the payload may be encrypted and only the metadata may be accessible. In other embodiments, the metadata may also be encrypted, and capturing the metadata may include decrypting the metadata, e.g., with a cryptographic key.

In some embodiments, the metadata may be stored in unused TCP/IP header blocks, according to aspects of the disclosure of the co-assigned, co-pending, U.S. patent application Ser. No. 16/403,695, entitled "NETWORK FORENSIC SYSTEM FOR PERFORMING TRANSMISSION METADATA TRACKING AND ANALYSIS," filed on even date herewith, which is hereby incorporated herein by reference in its entirety.

In other embodiments, the transmission may be scheduled by a preliminary transmission. The metadata may be encapsulated with the preliminary transmission. For example, prior to sending a primary transmission to a financial institution, a sender may send a preliminary transmission to schedule the primary transmission. The preliminary transmission may include information such as the size, sender, location, and time that the primary transmission is scheduled to be sent.

The method may include calculating, based on the metadata, a cost of the transmission. The cost may be a resource cost, i.e., an amount of resources depleted and/or rendered unavailable due to the transmission. In some embodiments, the cost may also include a monetary cost. For example, a sender of a transmission to an entity may be responsible for a "chargeback" cost based on the resources utilized by the transmission.

The cost may be based at least in part on a size of the transmission, or, alternatively, the size of the payload. The cost may depend on a value associated with the transmission. The cost may also depend at least in part on a duration for which a portion of the transmission will be stored. The cost over time may be linear, or, in some embodiments, may rise over time. The cost may be based at least in part on a distance the transmission travels, and the distance may be derived at least in part based on the location of a source of the transmission. The cost may, in certain embodiments, be adjusted based on time—for example, a transmission may be associated with a higher cost during busy/peak times.

The cost may also, in some embodiments, be adjusted based on the sender. Different senders may have different pricing schemes. For example, a high-volume sender may be associated with a discounted pricing scheme, or, alternatively, a more expensive pricing scheme. Some senders may have a more expensive pricing scheme that entitles them to faster or prioritized processing (this may affect resource allocation as well). A nature or classification of the payload may also affect the cost. For example, a payload that needs a high level of processing may be associated with a higher cost. Other suitable factors may also affect the cost calculation.

The cost may also include an estimate of a resource cost to an entity associated with the digital resources. Calculating the cost may, in certain embodiments, be at least in part a function of one or more elements of the metadata, such as the sender, the size, and the location.

The method may also include embedding the cost as part of the metadata. Embedding the cost of a transmission in the metadata of the transmission may enable the cost to be accessible from the transmission itself, without the need to access other sources, such as a database. Furthermore, the cost in the metadata can be updated in real-time, e.g., at every hop the transmission completes. This may provide a self-referencing, dynamically updated cost calculation for the transmission.

In some embodiments, the cost stored in the metadata may be configured to be accessible via a digital dashboard. The dashboard may be associated with the entity. Alternatively, or additionally, a dashboard may be associated with the sender. A dashboard associated with the sender may enable the sender to access the cost of a transmission in real-time.

A dashboard may also, in some embodiments, provide the sender with a level of control over the processing of the transmission. For example, a sender may be enabled to request that the transmission be aborted, or otherwise adjust the processing, via the dashboard.

The method may further include allocating, based on the metadata, a portion of digital resources for the transmission. The digital resources may include memory, processing power, communication bandwidth, energy such as electricity, and/or any other suitable resources. Allocating the portion of digital resources for the transmission may reserve an amount of the digital resources for the transmission. Allocating the portion of digital resources may also include reserving the digital resources for a certain amount of time. Allocating the digital resources may prevent overloading of the digital resources.

Furthermore, allocating the portion of digital resources based on the metadata may provide a relatively precise estimate of the amount of resources needed for the transmission. Allocating a precise amount may reduce wasteful allocation of resources. Wasteful allocation may occur when resources are allocated for a transmission that does not need them, preventing other transmissions from utilizing the unused resources. Allocating a precise amount, by contrast, may enable a high utilization rate of the resources.

Allocating the portion of digital resources based on the metadata may include a predefined function that maps an input of metadata to an output of resource allocation. For example, a transmission of a certain size may be allocated a certain amount of processing power, memory, and/or bandwidth.

In some embodiments, allocating a portion of the digital resources based on the metadata may be based at least in part on the cost that is embedded in the metadata. For example, a transmission may be allocated more resources, or given priority access to the resources, when the cost is high. Alternatively, a high cost transmission may be allocated resources after low cost transmissions are processed.

In some embodiments, the method may further include a feedback loop based on a forensic analysis. The feedback loop may include measuring an actual resource cost of the transmission. The measurement may be taken during processing of the transmission, or after the transmission has been processed. Based on a difference between the actual resource cost and the resource cost of the transmission that was calculated based on the metadata, the feedback loop may include adjusting a calculation used for calculating the cost. The adjusting may be useful for the current transmission or for another transmission. A feedback loop may also compare the portion of resources allocated to the amount of resources actually utilized. Based on the comparison, the method may include adjusting the calculation used for calculating the allocation for another transmission.

In certain embodiments of the method, the metadata may further include a security profile. The security profile may define a level of security for the transmission. Calculating the cost and allocating the portion of digital resources may be based at least in part on the security profile. For example, the security profile may indicate that the payload is or should be encrypted. Encrypting, decrypting, and managing the encryption tools (e.g., storing keys) may be associated with higher costs and resource utilization. In another example, a security profile may indicate that the payload needs multiple levels of verification or authentication, such as signatures by multiple authorizers. This may also be associated with a higher level of resource utilization and cost.

In some embodiments, the transmission may be one of a plurality of transmissions. A metadata record of each of the plurality of transmissions may be stored in a database. The metadata record may, for example, include an archive of the metadata of each of the plurality of transmissions.

The method may further include deriving a historical trend based on the metadata found in the metadata records in the database. The historical trend may include an average, mean, median, or any other suitable quantitative measurement of the historical trend of the metadata. The historical trend may also include a graph.

The method may also include generating a target allocation amount based on the historical trend. For example, the target resource allocation may be based on an average of the transmission sizes stored in the metadata records. The method may further include comparing the amount allocated based on the metadata to the target allocation amount. When the target allocation amount is more than a threshold difference apart from the amount allocated based on the metadata, the method may further include flagging the transmission.

In some embodiments of the method, the flagging may include rejecting the transmission. The flagging may also include sending an alert message to an entity associated with the digital resources. The alert message may convey that an unusual transmission has been detected. The flagging may mitigate the risk of a sender, purposefully or mistakenly, storing or processing transmissions that are unwanted by and/or harmful to the entity.

In some embodiments, the method may further include dynamically adjusting the target allocation amount when a new metadata record is stored in the database. For example, with/after every new transmission, the metadata records may be updated to include the metadata of the new transmission. The historical trend, e.g., an average, may be adjusted to reflect the update. In some embodiments, only the metadata of an unflagged transmission may be incorporated into the metadata records.

In certain embodiments, the plurality of transmissions may be sent by a plurality of senders. The method may further include generating a target allocation amount for each of the plurality of senders. When the method compares the amount allocated based on the metadata of a transmission to the target allocation amount, the target allocation amount may preferably be the target allocation amount generated for the same sender as the transmission. Alternatively, or additionally, the amount allocated may be compared to a target allocation amount that is an average of the target allocation amount of all of the senders.

Adjusting the target allocation amount may, in certain embodiments, be based at least in part on data external to the transmission. The data may relate to the sender. For example, the method may include mining a predetermined set of news sources for information that relates to a sender of one of the transmissions. The mining may, in some embodiments, be performed at least in part using a neural network. A neural network may be any suitable artificial intelligence ("AI") or machine-learning ("ML") tool that enables a computation based on training data. The neural network may be configured to compute a score for data retrieved in a search. The score may indicate a relevance of the data to certain concepts and/or subjects. The neural network may thus be configured to mine data sources, e.g., the whole internet or a predetermined selection of websites or platforms, for information relating to one of the senders that may relate to an increased or decreased level of digital transmissions to the entity. The method may further include adjusting the target allocation amount in real-time based on the information.

The digital transmissions may, in certain embodiments, include internal transmissions. Internal transmissions may include transmissions within one entity. For example, different departments within an entity may send transmissions to each other. It may be advantageous to track the costs and precisely allocate resources for the internal transmissions as well as for transmissions from outside the entity.

A method is provided for real-time cost calculation for a digital transmission, storage of the calculation results, and smart resource allocation based thereon. The digital transmission may include a payload. The digital transmission may be associated with metadata. The metadata may include a sender of the digital transmission, a size of the digital transmission, and a location of a source of the digital transmission.

The method may include maintaining an index of target resource allocations. Each target resource allocations may be derived for a sender from a plurality of senders. Each target resource allocation for a sender may be derived based on a historical record of the sender. The historical record of a sender may include a record of the metadata of digital transmissions of the sender.

The method may include receiving the digital transmission, and generating a cost estimate based on the metadata of the digital transmission. The method may also include embedding the cost estimate in the metadata of the digital transmission. The method may further include allocating digital resources for the digital transmission based on the metadata of the digital transmission. Allocating digital resources for the digital transmission may reserve the digital resources for the digital transmission and may prevent overloading of the digital resources.

The method may include triggering an alert when the digital resources allocated for the digital transmission are more than a threshold difference apart from the target resource allocation in the index for the sender of the digital transmission. The method may further include updating the historical record based on the metadata of the transmission.

In some embodiments, adjusting the index of target resource allocations may be partially based on subjective sender data. Subjective sender data may include information about a sender that may affect a transmission from the sender. For example, a news source may report that a certain sender is a part of a large business deal. This information may indicate that the sender may need more than usual transmission resources. The method may therefore include mining a predetermined set of news sources for information that relates to a sender. The mining may leverage machine-learning (ML) tools. The method may include adjusting the index of target resource allocations in real-time based on the information.

In some embodiments of the method, the metadata of the digital transmission may further include a security profile. The security profile may define a level of security for the digital transmission. Generating the cost estimate and allocating digital resources for the digital transmission may be based at least in part on the security profile.

In certain embodiments of the method, receiving the digital transmission may include receiving a preliminary transmission that schedules the digital transmission. The preliminary transmission may include the metadata associated with the digital transmission.

A computer system with self-referencing transmission cost calculation and dynamic resource allocation is provided. The computer system may include a target resource module. The target resource module may be configured to derive and store a target resource allocation for each sender from a plurality of senders. A target resource allocation may be derived for a sender based on a historical record of metadata of transmissions from that sender.

The computer system may include a cost-calculation engine. The cost-calculation engine may be configured to receive a transmission, and generate a cost estimate based on metadata associated with the transmission. The metadata may include a sender of the transmission, a size of the transmission, a length of the transmission, and a location of a source of the transmission. The cost-calculation engine may also be configured to embed the cost estimate in the metadata.

The computer system may also include a resource allocation module. The resource allocation module may be configured to allocate digital resources for the transmission based on the metadata. Allocating digital resources for the transmission may reserve the digital resources for the transmission, and may prevent overloading of the digital resources.

The computer system may be configured to trigger an alert when the digital resources allocated for the transmission are more than a threshold difference apart from the target resource allocation for the sender of the transmission. The computer system may also be configured to update the historical record of transmissions of the sender of the transmission based on the metadata of transmission.

In some embodiments of the computer system, the target resource module may be configured to mine a predetermined set of news sources for information that relates to a sender from the plurality of senders. Based on the information, the target resource module may adjust the target resource allocation of that sender in real-time based on the information.

In certain embodiments, the target resource module may further include a neural network. The mining may be performed at least in part using the neural network.

In some embodiments of the computer system, the metadata associated with the transmission may further include a security profile. The security profile may define a level of security for the transmission. Generating the cost estimate and allocating digital resources for the transmission may be based at least in part on the security profile.

Receiving the transmission may, in certain embodiments, include receiving a preliminary transmission. The preliminary transmission may schedule the transmission. The preliminary transmission may include the metadata associated with the transmission.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to digital transmissions. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to calculating costs, allocating resources, and/or facilitating digital transmissions in general.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
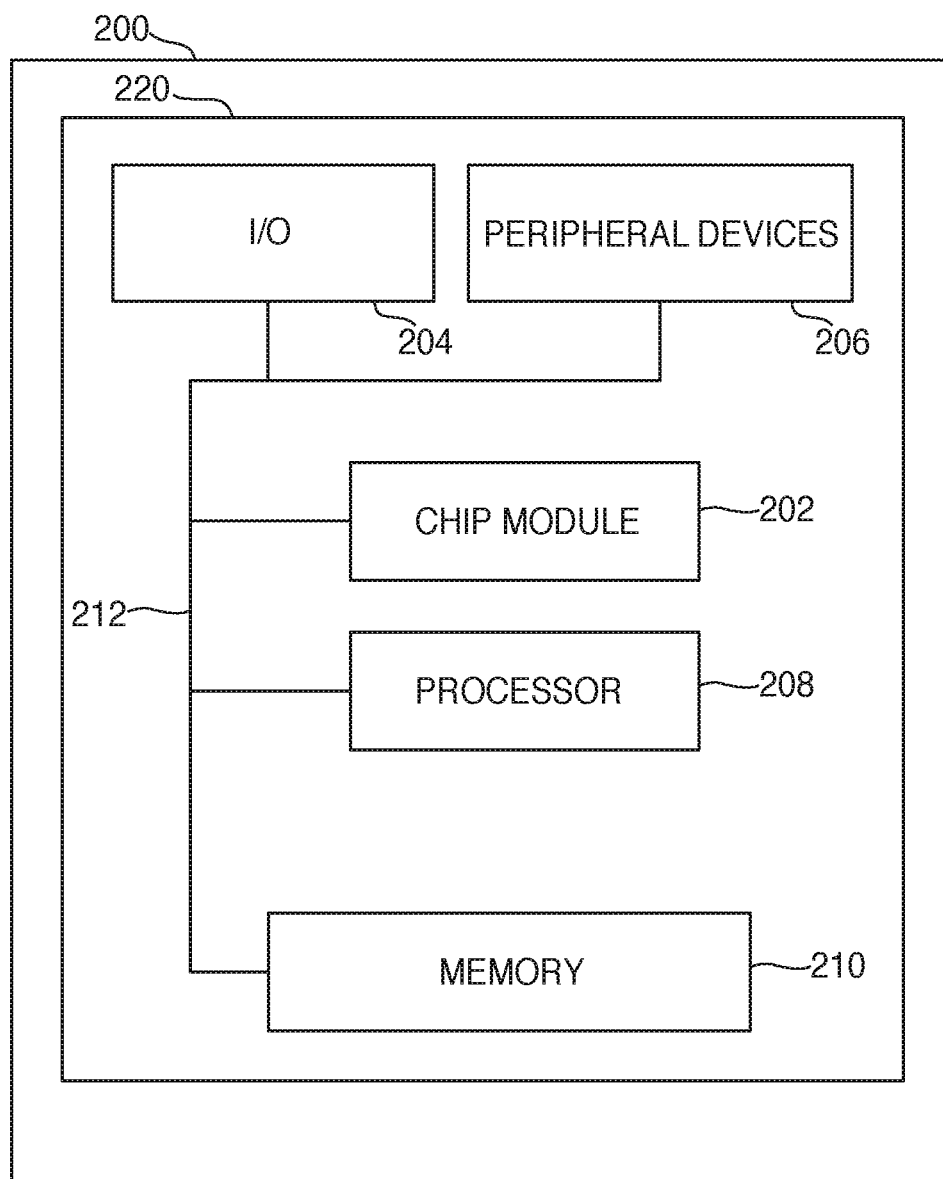
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
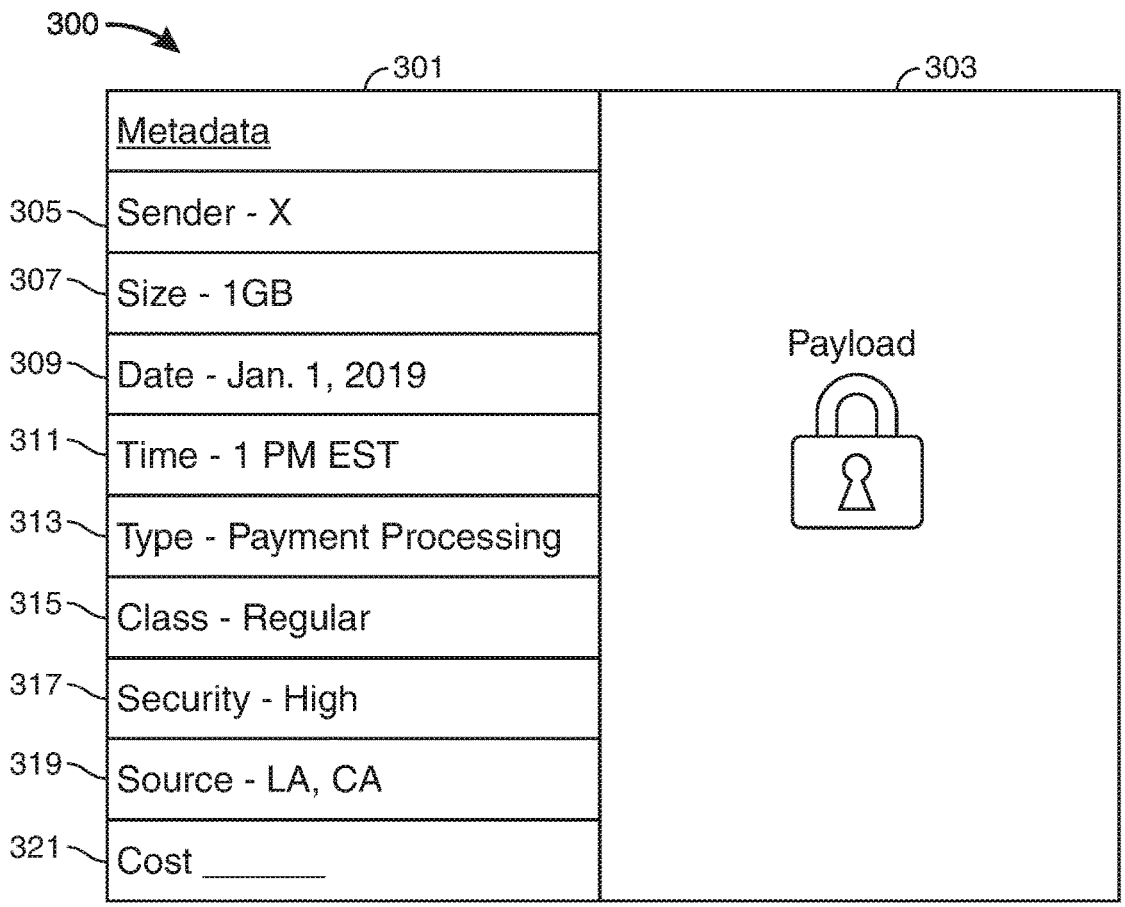
FIG. 3 shows an illustrative diagram in accordance with principles of the disclosure.

FIG. 3 shows illustrative diagram 300 of a transmission in accordance with aspects of the disclosure. The transmission may include multiple portions. Portion 301 may contain metadata, and portion 303 may contain the payload. The payload in portion 303 may, in some embodiments, be encrypted.

The metadata in portion 301 may include any suitable information about the transmission or the payload. In exemplary diagram 300, the metadata of the transmission includes data fields 305-321. Data field 305 may store the sender of the transmission (e.g., name and/or unique identifier). Data field 307 may store the size of the payload or the entire transmission. Data field 309 may store the date that the transmission was sent or received. Data field 311 may store the time the transmission was sent or received. Data field 313 may store a "type." The type may be selected from a predetermined list, and it may describe the nature of the payload. Data field 315 may store a "class" of the transmission. The class may describe any classification of the transmission, e.g., if the transmission has priority privileges. Data field 317 may store a security profile of the transmission. For example, the transmission may be associated with a high security level, which may involve higher levels of processing. Data field 319 may store a location of a source of the transmission. The source may be a city of origin. Data field 321 may store a cost of the transmission. Data field 321 may be updated with cost data after the transmission is received and the cost is calculated based on the rest of the metadata.

Figure 4:
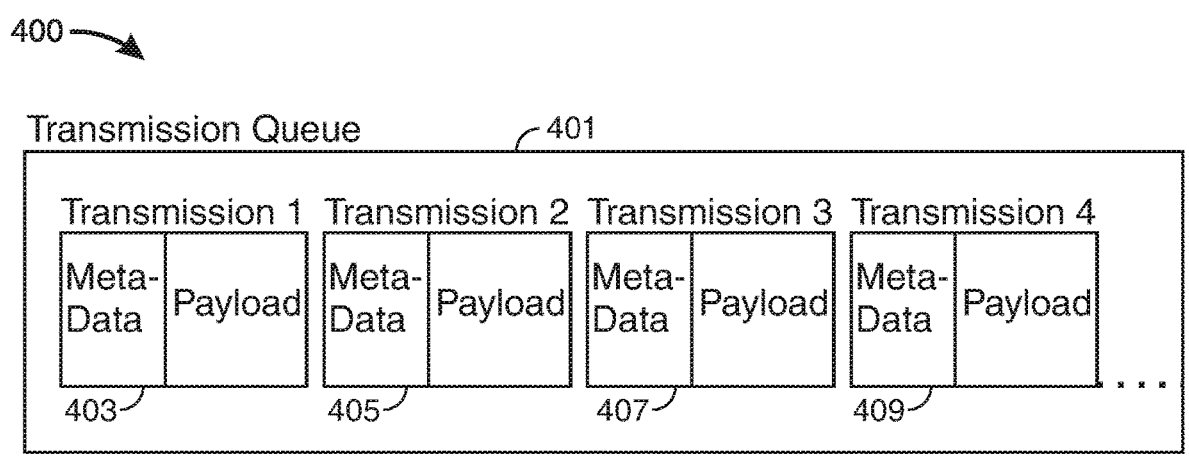
FIG. 4 shows an illustrative schematic in accordance with principles of the disclosure.

FIG. 4 shows illustrative schematic 400 of a plurality of transmissions in accordance with aspects of the disclosure. Schematic 400 may include transmission queue 401. Transmission queue 401 may be an actual data structure (e.g., a stack, heap, queue, or any other suitable data structure), or a virtual representation of one way a system may handle a plurality of received transmissions.

Transmission queue 401 may include transmissions 403-409. Each of transmissions 403-409 may be similar to the transmission shown in diagram 300 of FIG. 3 above. The transmissions may, in some embodiments, be processed one by one—e.g., using a first in first out (FIFO) or last in first out (LIFO) algorithm. In some embodiments, the system may capture the metadata of all the transmissions in the queue, and allocate resources for the transmissions in part by balancing the needs of all of the transmissions simultaneously.

Figure 5:
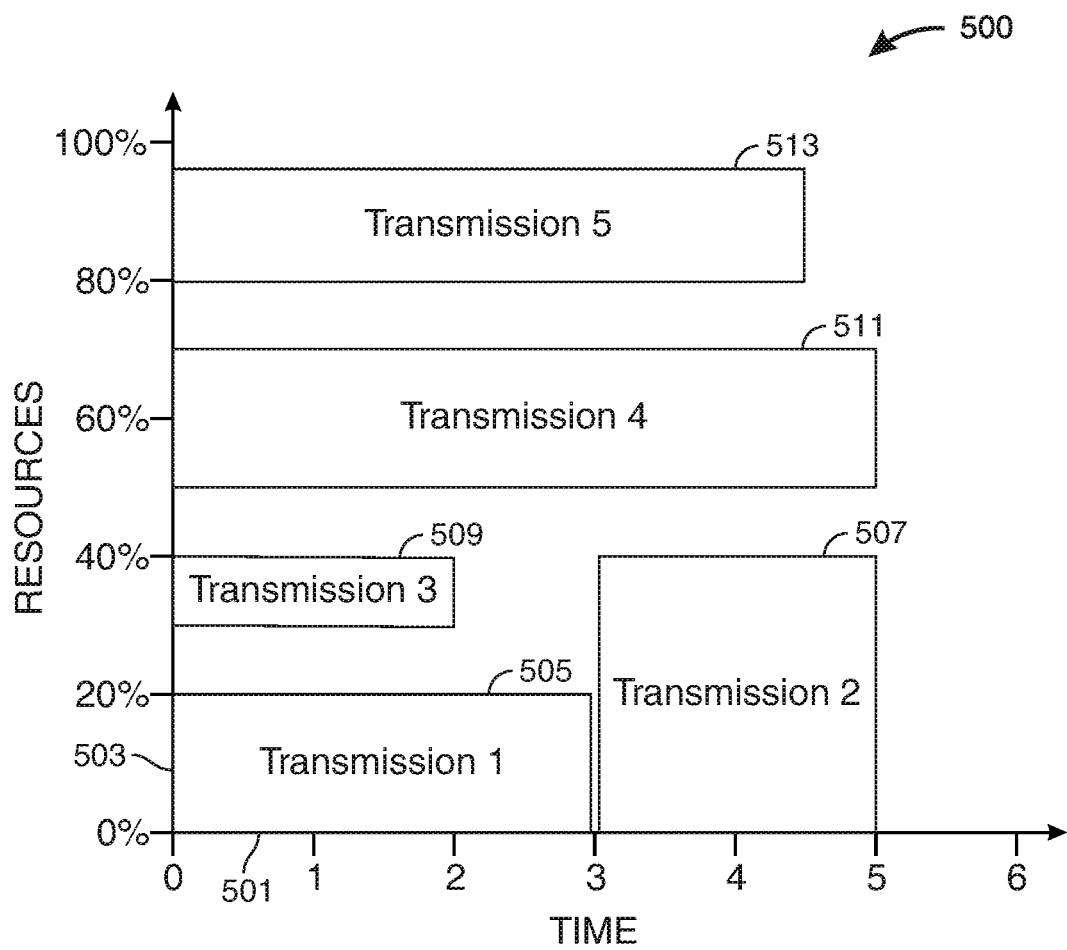
FIG. 5 shows an illustrative graph in accordance with principles of the disclosure.

FIG. 5 shows illustrative graph 500 in accordance with aspects of the disclosure. Graph 500 shows one example of how a system may schedule the processing (i.e., utilizing resources for a transmission) of multiple transmissions. Graph 500 may include time axis 501 and resource axis 503. Units along time axis 501 may be any suitable units of time, for example hours, minutes, seconds, milliseconds, or microseconds. Units along resource axis 503 may be any suitable units of the resource. For example, if the resource is memory, the units may be bytes, megabytes, kilobytes, gigabytes, terabytes, or any other suitable unit for computer memory. The units of resource axis 503 may preferably be percentage points, representing percentages of resources available for transmissions.

The system may first derive an amount and/or time for resource allocation for each of transmissions 505-513. Based on the derived allocations, the system may schedule the transmission processing in a way that maximizes resource utilization. For example, transmission 505 may need 3 time-units of 20% of the resources, transmission 507 may need 2 time-units of 40% of the resources, transmission 509 may need 2 time-units of 10% of the resources, transmission 511 may need 5 time-units of 20% of the resources, and transmission 513 may need 4.5 time-units of 15% of the resources. The system may, to maximize resource utilization, schedule the processing of transmissions 505 and 509-513 to begin at time 0, each on its respective portion of allocated resources. When transmission 505 is completed at time 3, the system may process transmission 507. The scheduling may, in some embodiments, enforce a predetermined buffer of resource amount and/or time between scheduled transmissions.

Figure 6:
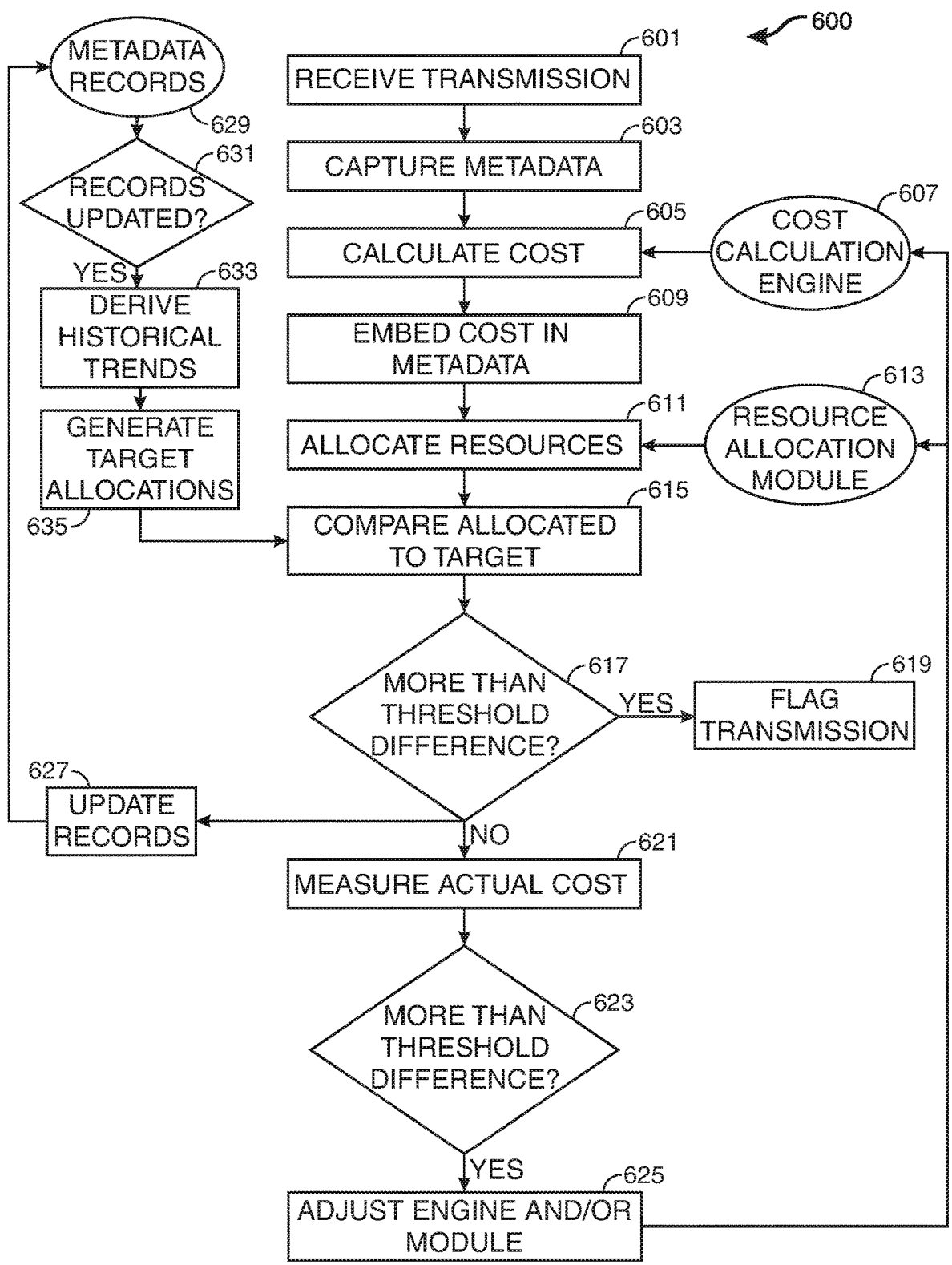
FIG. 6 shows an illustrative flowchart in accordance with principles of the disclosure.

FIG. 6 shows illustrative flowchart 600 of a system in accordance with aspects of the disclosure. Flowchart 600 may show one exemplary embodiment of the disclosure, other embodiments may include any other steps, elements, combinations, and/or sequences other than those shown in flowchart 600.

The system may receive a transmission at step 601. The system may capture metadata at step 603. The system may calculate a cost at step 605. The cost calculation may be performed by a cost calculation engine 607. The system may embed the cost in the metadata at step 609. The system may allocate resources at step 611. Resource allocation may include deriving an amount and/or time for resource allocation, as well as actually scheduling and reserving the resources for the transmission to utilize. The resource allocation may be performed by a resource allocation module 613.

At step 615, the system may compare the resources allocated at step 611 to a target resource allocation generated at step 635. Step 617 queries if there is more than a threshold difference based on the comparison of step 615. If there is more than a threshold difference, the transmission may be flagged at step 619. Either way, the system may proceed with two parallel processes, step 621 and 627.

At step 627, the system updates metadata records 629. Metadata records 629 may include a database storing an archive of metadata from other transmissions in the system. When metadata records 629 are updated, step 631 triggers step 633. At step 633, the system derives historical trends based on metadata records 629. Based on the historical trends, the system at step 635 generates target allocations. The updating process, including steps 627-635, may be executed once per transaction, and may be most useful for comparisons (step 615) of transactions other than the current transaction.

At step 621, the system measures an actual cost of the transmission. The cost may include an amount and/or time of resources utilized. This step may be performed after the transmission is finished utilizing resources. Step 623 queries whether the actual cost is more than a threshold difference apart from the cost that was calculated at step 605 and/or the resources that were allocated at step 611. If there is more than a threshold difference, the system may adjust, at step 625, the cost calculation engine 607 and/or the resource allocation module 613 to be more accurate for other transmissions.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for providing self-referencing utilization calculation and dynamic resource allocation based thereon for digital transmissions are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for allocating resources for processing and storing digital transmissions, the method comprising:
    capturing metadata that is associated with a transmission, said metadata comprising:
        a sender of the transmission;
        a size of the transmission; and
        a location of a source of the transmission;
    mining, using an artificial intelligence ("AI") machine-learning neural network, a predetermined set of Internet news sources to obtain information that relates to the sender of the transmission;
    computing a relevancy score based on the information, wherein the relevancy score relates to an increased or decreased level of digital transmissions from the sender;
    calculating, based on the metadata, a cost of the transmission;
    embedding the cost as part of the metadata; and
    allocating, based on the metadata and the relevancy score, a portion of digital resources for the transmission;
    wherein:

the allocating the portion of the digital resources for the transmission reserves an amount of the digital resources for the transmission and prevents overloading of the digital resources.

2. The method of claim 1, wherein:
the cost comprises:
an estimate of a resource cost to an entity associated with the digital resources; and
a monetary cost to the sender;
the calculating the cost is at least in part a function of the sender, the size, and the location;
the digital resources comprise memory, processing power, and/or communication bandwidth; and
the allocating the portion of the digital resources is based at least in part on the cost.

3. The method of claim 1, further comprising:
measuring an actual resource cost of the transmission; and
based on a difference between the actual resource cost and the cost of the transmission that was calculated based on the metadata, adjusting a calculation used for the calculating.

4. The method of claim 1, wherein the metadata further comprises a security profile, said security profile that defines a level of security for the transmission, and the calculating the cost and the allocating the portion of the digital resources are based at least in part on the security profile.

5. The method of claim 1, wherein the transmission is one of a plurality of transmissions, and a metadata record of each of the plurality of transmissions is stored in a database, and the method further comprises:
deriving a historical trend based on the metadata records in the database;
generating a target allocation amount based on the historical trend; and
when the amount allocated based on the metadata is more than a threshold difference apart from the target allocation amount, flagging the transmission, said flagging comprising rejecting the transmission and/or sending an alert message to an entity associated with the digital resources.

6. The method of claim 5, further comprising dynamically adjusting the target allocation amount when a new metadata record is stored in the database.

7. The method of claim 5, wherein the plurality of transmissions are sent by a plurality of senders, and the method further comprises generating a target allocation amount for each of the plurality of senders.

8. The method of claim 5, further comprising:
adjusting the target allocation amount in real-time based on the information.

9. The method of claim 1, further comprising configuring a digital dashboard to provide the sender with access to the cost.

10. The method of claim 1, wherein the metadata is encapsulated with the transmission.

11. The method of claim 1, wherein the transmission is scheduled by a preliminary transmission, and the metadata is encapsulated with the preliminary transmission.

12. A method for real-time cost calculation and smart resource allocation for a digital transmission, the digital transmission comprising a payload and associated with metadata, the metadata comprising a sender of the digital transmission, a size of the digital transmission, and a location of a source of the digital transmission, the method comprising:
deriving and storing a target resource allocation for each sender from a plurality of senders, wherein deriving the target resource allocation for a sender is based on a historical record of metadata of transmissions from the sender;
receiving the digital transmission;
generating a cost estimate based on the metadata of the digital transmission;
embedding the cost estimate in the metadata of the digital transmission;
mining, using an artificial intelligence ("AI") machine-learning neural network, a predetermined set of Internet news sources to obtain information that relates to each sender of the transmission;
computing a relevancy score based on the information, wherein the relevancy score relates to an increased or decreased level of digital transmissions from the sender;
allocating digital resources for the digital transmission based on the metadata of the digital transmission and the relevancy score;
triggering an alert when the digital resources allocated for the digital transmission are more than a threshold difference apart from the target resource allocation for the sender of the digital transmission; and
updating the historical record of the sender of the digital transmission based on the metadata of the digital transmission;
wherein the allocating digital resources for the digital transmission reserves the digital resources for the digital transmission and prevents overloading of the digital resources.

13. The method of claim 12, further comprising:
adjusting the target resource allocations in real-time based on the information.

14. The method of claim 12, wherein the metadata of the digital transmission further comprises a security profile, said security profile that defines a level of security for the digital transmission, and the generating the cost estimate and the allocating digital resources are based at least in part on the security profile.

15. The method of claim 12, wherein the receiving the digital transmission comprises receiving a preliminary transmission that schedules the digital transmission, and the preliminary transmission comprises the metadata associated with the digital transmission.

16. A computer system with self-referencing transmission cost calculation and dynamic resource allocation, said computer system comprising:
a target resource module, said target resource module configured to:
derive and store a target resource allocation for each sender from a plurality of senders, each target resource allocation for a sender derived based on a historical record of metadata of transmissions from the sender;
mine, using an artificial intelligence ("AI") machine-learning neural network, a predetermined set of Internet news sources to obtain information that relates to each sender; and
compute a relevancy score based on the information, wherein the relevancy score relates to an increased or decreased level of digital transmissions from each sender;
a cost-calculation engine, said cost-calculation engine configured to:
receive a transmission,
generate a cost estimate based on metadata associated with the transmission, said metadata comprising a sender of the transmission, a size of the transmission, and a location of a source of the transmission; and embed the cost estimate in the metadata; and a resource allocation module, said resource allocation module configured to allocate digital resources for the transmission based on the metadata, wherein allocating digital resources for the transmission reserves the digital resources for the transmission and prevents overloading of the digital resources;

wherein the computer system is configured to:

trigger an alert when the digital resources allocated for the transmission are more than a threshold difference apart from the target resource allocation for sender of the transmission; and update the historical record of the sender of the transmission based on the metadata of the transmission.

17. The computer system of claim 16, wherein the target resource module is configured to:

adjust the target resource allocation of each sender in real-time based on the information.

18. The computer system of claim 16, wherein the metadata associated with the transmission further comprises a security profile, said security profile that defines a level of security for the transmission, and the computer system is further configured to generate the cost estimate and allocate digital resources based at least in part on the security profile.

19. The computer system of claim 16, wherein the cost-calculation engine is further configured to receive the transmission by receiving a preliminary transmission that schedules the transmission, and the preliminary transmission comprises the metadata associated with the transmission.

* * * * *